(No Model.)
W. D. DAVIES.
REGULATING ATTACHMENT TO CLOCK PENDULUMS.
No. 267,161. Patented Nov. 7, 1882.
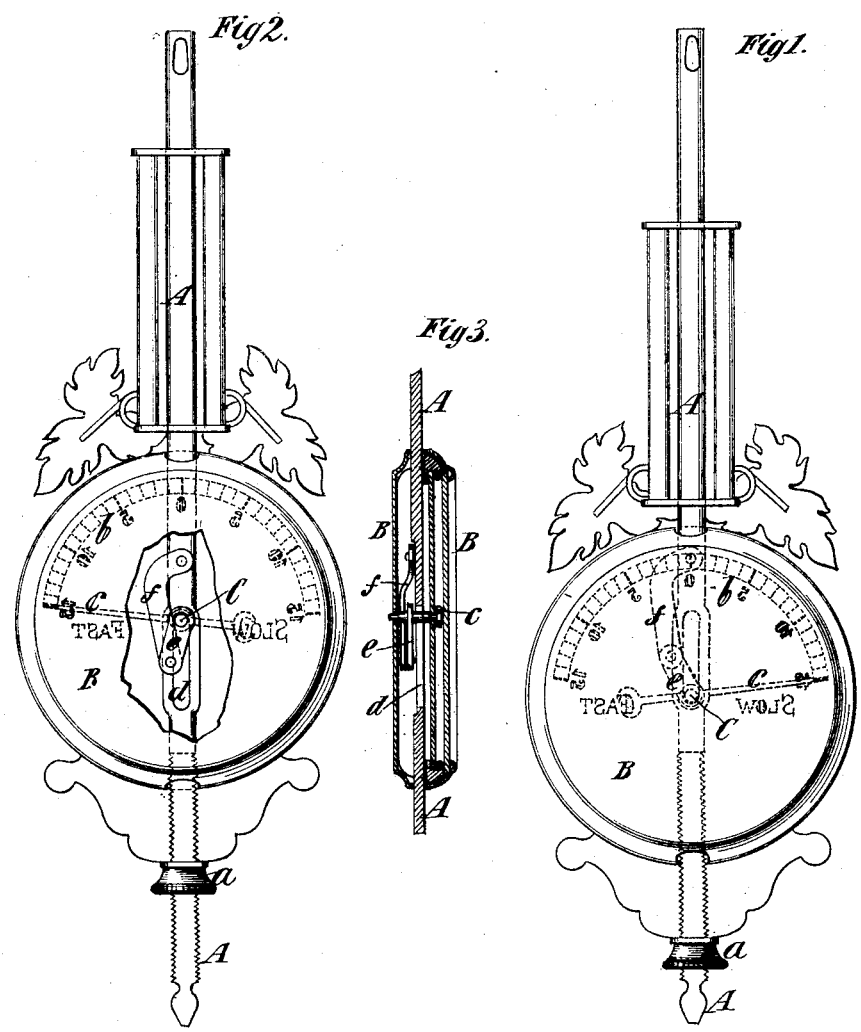

UNITED STATES PATENT OFFICE.

WALTER D. DAVIES, OF BROOKLYN, NEW YORK, ASSIGNOR TO HIMSELF AND HENRY J. DAVIES, OF SAME PLACE.

REGULATING ATTACHMENT TO CLOCK-PENDULUMS.

SPECIFICATION forming part of Letters Patent No. 267,161, dated November 7, 1882.

Application filed June 10, 1882. (No model.)

*To all whom it may concern:*

Be it known that I, WALTER D. DAVIES, of Brooklyn, in the county of Kings and State of New York, have invented certain new and Improved Regulating Attachments to Clock-Pendulums, of which the following is a specification.

My invention relates to that class of pendulums in which the degree of adjustment of the pendulum ball or bob along the pendulum-rod is indicated by an index or finger upon a graduated scale upon the ball or bob; and the invention consists in a novel means of transmitting motion from the movement of the adjustable ball or bob along the rod to the index or finger, so as to turn it, as hereinafter described and claimed.

In the accompanying drawings, Figure 1 represents a back view of a pendulum embodying my invention. Fig. 2 represents a similar view of the pendulum, with the back broken away to show the means employed to connect the index or finger with the rod; and Fig. 3 represents a central vertical section of the pendulum.

Similar letters of reference designate corresponding parts in all the figures.

A designates the pendulum-rod, and B designates the pendulum ball or bob, which is adjustable along said rod. The means here represented for adjusting the ball or bob consists of a nut, *a*, screwed upon the lower end the rod, and upon which the ball or bob rests. Upon the face of the ball or bob is a graduated arc-shaped scale, *b*, and numbers designating the divisions; and C designates a shaft or arbor extending through the ball or bob, and carrying upon its outer end an index or finger, *c*, which travels along the scale *b*. The rod A is provided with a slot or yoke, *d*, which receives the shaft or arbor through it and permits the movement of the ball or bob along the rod. Upon the shaft or arbor C, and within the ball or bob B, is an arm or lever, *e;* and *f* designates a link or connection pivoted at one end to the arm or lever *e* and at the other end to the rod A.

From the foregoing description it will be evident that as the ball or bob B is moved on the rod A the shaft or arbor C will move with it, and by the link *f* pulling or pushing on the arm or lever *e* the shaft or arbor C will be turned, and with it the index or finger *c*, thereby causing the latter to traverse along the scale *b* in one direction or the other.

By my invention I provide a very simple and inexpensive combination of devices for transmitting motion to or turning the index or finger, which are not liable to get out of order.

What I claim as my invention, and desire to secure by Letters Patent, is—

1. The combination, with the pendulum-rod A and its ball or bob B, adjustable thereon, of the shaft or arbor C in the ball or bob, carrying an index or finger, *c*, the arm or lever *e* on said shaft or arbor, and the link *f*, forming a connection between said rod and said arm or lever, whereby said shaft or arbor and its index or hand are caused to turn by the movement of the ball or bob upon the rod, substantially as described.

2. The combination, with the rod A, provided with the slot or yoke *d*, and the adjusting-nut *a*, of the ball or bob B, the shaft or arbor C, the index or finger *c*, the arm or lever *e*, and the link *f*, substantially as herein described.

WALTER D. DAVIES.

Witnesses:
 E. M. DE GROVE,
 A. J. BURTON.